3,175,876
SCENT PRODUCING CANDLE AND METHOD
FOR MAKING SAME
William M. Fredericks, 1721/2 S. Madison St.,
Spokane 4, Wash.
No Drawing. Filed June 18, 1962, Ser. No. 203,017
6 Claims. (Cl. 21—116)

This invention relates to a new and different scent producing candle, and a process for making same.

Practically all of the scented candles now on the market, and those available in the past, have derived their scent from the addition of plain or simple odor ingredients to the candle body. There is no denying that the odors are pleasing when the unlighted candle itself is smelled, and I hereby disclaim its invention, since pleasant smelling ingredients may have been added to candles, since antiquity.

However, when these candles are burning, there is little or no odor of these ingredients yielded in the flame, due to the oxidation of the odor ingredients by the flame, which burns the oils, alcohols or concentrates etc. containing the scents, and the odors or scents are killed or neutralized in that part of the candle which is burning. When such candles are extinguished, there may be a slight odor given off, but this is very meager, beacuse most efforts have been directed toward preventing candles from smoking at the wick, when the candle is extinguished.

Most candle wicking has been impregnated with chemicals which prevent afterglow and smoldering and smoking, and even if the wicking has not been impregnated with chemicals, scented candles so made still do not yield any satisfactory odor or scent in the flame. The wick, if it smolders, smells mostly of burning cotton, or whatever it may be composed of, and not of the perfume or incense etc. you might expect to smell.

The principal object of my invention is the making of scented candles which yield maximum pleasant scent or odor, while the candle is burning, and which yield additional maximum pleasing scent of a high order, when the candle is extinguished, and the wick is smoldering. Many experts said this could not be done.

This is made possible by the use of a carrier or vehicle, the purpose of which is to set up a condition analogous to that of a radio carrier wave, upon which the sound wave rides piggy-back, as it were.

In this case, the carrier seems to store, hold or trap, and then release the wanted scent or odor, in the flame, as the candle burns, and afterwards, from a special deliberate smoldering or smoking condition generated when the candle is extinguished.

The carriers or vehicles I use comprise combustible substances of a carbonaceous nature, which carbonize and oxidize, and finally consume themselves in the flame and on the wick.

These carriers are the sugars, among which may be sucrose, dextrose, levulose, mannose, etc. etc. in their various products of use, such as white sugar, brown sugar, maple sugar, glucose, syrups, sorghum, molasses and the like, or their mixtures.

They may be used alone, or in combination with other carbonaceous paste-forming desiccants, which also finally consume themselves along with the carrier, in the flame, and on the smoldering wick, which also is consumed.

The smoldering triggers the smoking, which is not produced visibly or actively, when the candle is burning, but is copious and full of the scent used, when the candle is extinguished.

Among the carbonaceous smoke-producing drying or desiccating agents, are powdered cocoa, powdered instant coffee, powdered cinnamon, powdered nutmeg, powdered instant tea, starches, flour, gum arabic, dextrine, and such products or their mixtures. These desiccants may or may not have an odor of their own, the object being to blend them with whatever scent or odor is used, which may be spicy, or fruity, or of flowers, or of balsams or gums, etc. etc. and which may have been chosen, and incorporated in the candles.

The carrier can be incorporated dry in the candle body material, such as waxes etc., in a suitable manner, as by stirring it in the melted wax, or as a dry mixture of the carrier and the desiccator, or can be introduced into the candle, by building up a partially finished candle body in diameter, and then applying a watery paste, or a heated pasty ribbon of the carrier, with or without the desiccator, lengthwise of the unfinished candle, on one or more sides, but not surrounding it at any point, the object being to leave a channel or channels by which the wax can feed the flame. When this limited application has dried, or set, then the candle is built up to the desired diameter, with the candle material.

When incorporated in the candle, in any suitable manner, the carrier, and the desiccator, if used, gravitate to the wick when the candle is burning, and tend to accumulate as a porous carbonized coating on the consuming wick, which stands up in the flame about one-half inch long. When the tip of this encrusted wick bends out into the flame cone, it consumes the carrier, and the desiccator and the wick.

There is a very noticeable yield of scent or odor in the flame of the candle. If at this point, the candle is extinguished, the wick and its accumulation will smolder, and consume, and yield a copious amount of smoke loaded with the scent or odor used.

The wick will consume down to smaller size, and the candle can be relighted for many similar repeat performances, and in this manner get the maximum amount of odor or scent, which is the principal object of this invention.

The wicking I use should be plain, untreated, so that the foregoing results can be obtained.

It has been found most advantageous in preventing the destruction of the scent or odor, by the flame, when the candle is burning, by this simple procedure.

If the carrier, with or without the desiccator, is admixed into the candle body as by stirring in, into the candle body mass containing the scent or odor, then the plain wick should also be impregnated with the scent.

When the carrier, with or without the desiccator, is applied as a limited ribbon, as explained above, then the carrier, with or without the desiccator, should also have additional scent in the paste.

The use of the carriers, is critical, for without them, there would be little or no odor or scent in the flame, while the candle is burning.

*Example No. 1*

To the candle body material, add from about 1% to about 5% of a pungent spicy scent like cinnamon oil. Immerse, or draw the wick through the cinnamon oil for additional odor yield. Stir into the melted and scented candle material, from a trace to about 5% of powdered brown sugar, as a carrier. Keep stirred to prevent settling out of the carrier, and cast the combined mixture into candle molds, care being taken to disperse well and not to make the brown sugar addition too heavy, so that it will gravitate towards the wick, and will consume properly in the flame, and on the wick, and there is sufficient candle material also present, feeding the flame, so that the candle will not be extinguished.

Example No. 2

A rose oil scent is added to candle body material, from about ½ of 1%, to about 10%. The candle is made up, as by casting or dipping, to about ¼ to about ¾ size in diameter, of the proposed diameter of the finished candle, with the scented candle material.

A paste is made of a mixture of about 75% by volume of maple sugar, and 25% by volume of powdered cocoa, and about 1% to about 5% of rose oil and a little water. Apply this paste on one side of the candle length on the surface of the smaller diameter candle, but not surrounding the candle. If surrounded, while burning, this would cause the candle to be extinguished, as the wax of the candle material, could not feed the flame.

This pasty application should not be too heavy, but on the order of a thin ribbon, which gravitates into the flame, and onto the wick, while the candle is burning.

This ribbon or application is carbonized in the flame. When the application has dried or set, the candle is built up to its full diameter. The cocoa used as a desiccator, assists in faster drying of the application, and helps to hold the maple sugar carrier on the wax surface.

It is understood that the proportions or amounts of the ingredients can be varied to suit the taste or to obtain the results desired, and does not necessarily confine the proportions of the ingredients to the amounts suggested in the examples.

I claim:

1. A scent yielding candle composed of a wax body, a plain cotton wick, and scent producing ingredients contained in a dried application of a sugar and a paste-forming carbonaceous substance.

2. A scent producing wax candle, containing a plain cotton wick, and a dried application of a paste-forming mixture of powdered cocoa and maple sugar.

3. A scented candle which yields a scent in the flame while the candle is burning and copious pleasant scent at the wick when the candle is extinguished, comprising a wax body, a plain cotton wick, a dried application of a mixture of maple sugar, a selected additional scent, and powdered cocoa.

4. The process of making an improved pleasant scent producing candle, which comprises building up a wax candle containing a plain cotton wick, to about ¼ (one quarter) to ¾ (three quarters) size in diameter of the proposed finished candle, and applying to this smaller diameter waxy surface lengthwise, one or more ribbons which do not entirely surround the circumference of the candle, of a watery paste of medium viscosity of a mixture of a sugar and a carbonaceous paste-former, and allowing the mixture to dry, and then building up the candle to the full size.

5. The process of making a pleasant scent yielding candle, which comprises building up a wax candle containing a plain cotton wick, to about ¼ (one quarter) to ¾ (three quarters) size in diameter of the intended full size, and applying to this waxy surface an application of a medium viscosity watery paste mixture lengthwise, which does not entirely surround the circumference of the candle, so as to leave channels through which the melted wax of the burning candle can feed the flame, the watery paste consisting of a mixture of about 75% (seventy-five percent), by volume, of maple sugar, and about 25% (twenty-five percent) of powdered cocoa, allowing the application to dry, and building up the candle to the desired size.

6. The process of making a scented candle which yields a positive pleasant scent in the flame, when the candle is burning, plus copious and intense additional fragrance from the wick when the candle is extinguished, which comprises building up a wax candle containing a plain cotton wick, to about ¼ (one quarter) to about ¾ (three quarters) size in diameter of its intended full size, and applying a medium viscosity application lengthwise on the waxy surface, but which does not entirely surround the circumference of the candle, of a watery paste of maple sugar in proportion of about 75% (seventy-five percent) by volume, and powdered cocoa of about 25% (twenty-five percent) by volume, and any additional fragrance selected of about 1% (one percent) to about 5% (five percent) by volume, and allowing the pasty application to dry, and then building up the candle to its full size.

References Cited by the Examiner

UNITED STATES PATENTS

| | | | |
|---|---|---|---|
| 1,672,463 | 6/28 | Morczewski | 67—22 X |
| 1,701,844 | 2/29 | Funke | 44—7.5 |
| 1,831,902 | 11/31 | Brown | 67—22.5 |
| 2,323,804 | 7/43 | Driscoll | 67—22 X |
| 2,465,474 | 3/49 | Peterson | 67—22 X |

FOREIGN PATENTS 6,710    1890    Great Britain.

EDWARD J. MICHAEL, *Primary Examiner.*

FREDERICK L. MATTESON, JR., PERCY L. PATRICK, *Examiners.*